United States Patent [19]

Stroezel et al.

[11] 3,967,711
[45] July 6, 1976

[54] RATCHET TYPE SAFETY CLAW CLUTCH

[75] Inventors: Reinhold Stroezel, Leinfelden; Alfred Hettich, Stetten; Manfred Kirn, Stuttgart, all of Germany

[73] Assignee: Robert Bosch G.m.b.H., Stuttgart, Germany

[22] Filed: Oct. 3, 1974

[21] Appl. No.: 511,912

[30] Foreign Application Priority Data
Oct. 12, 1973 Germany............................ 2351240

[52] U.S. Cl............................. 192/108; 192/114 T; 64/9 R; 64/29
[51] Int. Cl.²........................................ F16D 11/00
[58] Field of Search.................. 192/108, 114 T, 46; 64/9 R, 29

[56] References Cited
UNITED STATES PATENTS

| 2,398,570 | 4/1946 | Wildhaber | 192/108 |
| 3,834,252 | 9/1974 | Abell et al. | 192/108 |

FOREIGN PATENTS OR APPLICATIONS

| 908,130 | 6/1944 | France | 192/108 |
| 436,232 | 11/1926 | Germany | 192/108 |
| 581,277 | 7/1933 | Germany | 192/108 |

Primary Examiner—Samuel Scott
Assistant Examiner—Randall Heald
Attorney, Agent, or Firm—Michael J. Striker

[57] ABSTRACT

A safety claw clutch wherein the adjacent end faces of driving and driven rotary clutch elements have alternating claws and recesses and the driven clutch element is biased axially against the driving clutch element by a spring. The bottom surfaces in the recesses of the clutch elements make a first acute angle with a plane which is normal to the common axis of the clutch elements and the front surfaces of claws of the driving clutch element (and hence the rear surfaces of claws of the driven clutch element) make with such plane a second acute angle which is larger than the first acute angle. The top surfaces of the claws are parallel to the respective bottom surfaces. Such configuration of the claws and recesses insures that the force which tends to reengage the clutch elements when the driving clutch element rotates relative to the driven clutch element upon disengagement of the clutch is a small fraction of the force which normally maintains the claws of the driving clutch element in the recesses of the driven clutch element and vice versa because the claws of the driving clutch element cannot enter the recesses of the driven clutch element.

10 Claims, 10 Drawing Figures

RATCHET TYPE SAFETY CLAW CLUTCH

BACKGROUND OF THE INVENTION

The present invention relates to improvements in so-called ratchet type claw clutches or safety clutches. More particularly, the invention relates to improvements in clutches of the type wherein the claws of a rotary driving clutch element normally mesh with the claws of a rotary driven clutch element to transmit torque to one or more components which are rotated by the driven clutch element, and wherein one of the clutch elements is biased axially toward the other clutch element.

It is known to install in a power tool a safety clutch normally transmits torque to a tool spindle or the like and becomes disengaged when the driven clutch element offers excessive resistance to rotation with the driving clutch element. The two clutch elements are mounted and are rotatable on a common shaft and at least one thereof is movable axially against the opposition of biasing means to disengage its claws from the claws of the other clutch element when the resistance which the driven clutch element offers to rotation reaches a preselected value or when the speed of the driven clutch element exceeds the speed of the driving clutch element. The clutch elements may constitute disks or rings and may form part of or may be rigidly connected to pinions, gears or the like. The resistance which the axially movable clutch element must overcome in order to permit a disengagement of the clutch can be regulated by changing the bias of the spring or springs which urge the claws of the clutch elements into mesh with each other.

For example, when a safety clutch of the just described character is installed in a portable power tool wherein a pneumatic or electric motor normally rotates a screwdriver, a drill or another rotary tool, the clutch insures that the operator is not injured when the tool ceases to rotate or the rotational speed of the tool decreases because the working end of the tool encounters excessive resistance to penetration into or rotation of a workpiece or the like. As a rule, the claws of the clutch elements in ratchet type safety clutches have abutting inclined surfaces which transmit torque under normal circumstances but slide over each other when the tool jams or its rotational speed decreases. Once the clutch is disengaged, the claws of the driving clutch element ride over the claws of the driven clutch element, thereupon enter the spaces between the claws of the driven clutch element, again ride over the claws of the driven clutch element, and so on until the resistance of the driven clutch element decreases or the motor which drives the driving clutch element is arrested. The magnitude of the so-called disengaging moment (at which the driving clutch element becomes disengaged from the driven clutch element) is relatively high, depending on the bias of the clutch spring(s), and the magnitude of the moment which remains and tends to reengage the clutch while the driving clutch element rotates relative to the driven clutch element is also relatively high. In most instances, the remaining or reengaging moment equals or approximates 90 percent of the disengaging moment. This causes excessive wear on the elements of the clutch and compels the operator to exert a very substantial effort in order to hold the housing of the power tool against rotation. The remaining or reengaging moment (while the clutch is disengaged and while the driving clutch element continues to rotate) is less than the disengaging moment because friction between the abutting surfaces of clutch elements is less when the driving clutch element rotates with respect to the driven clutch element. This is due to the fact that the force with which the material of the driving clutch element tends to adhere to the material of the driven clutch element in engaged condition of the clutch (factor $\mu$) is higher than when the claws of the driving clutch element ratchet over the claws of the driven clutch element.

SUMMARY OF THE INVENTION

An object of the invention is to provide a safety claw clutch wherein the reengaging moment is a relatively small fraction of the disengaging moment.

An other object of the invention is to provide a safety claw clutch with novel and improved driving and driven clutch elements.

A further object of the invention is to provide a safety clutch wherein the claws of the driving clutch element continuously ride over the claws of the driven clutch element or vice versa when the clutch is disengaged while one of the clutch elements continues to rotate relative to the other clutch element.

An additional object of the invention is to provide a safety claw clutch having a high disengaging moment but a low reengaging moment.

Still another object of the invention is to provide the clutch elements of a safety claw clutch with novel and improved claws.

The invention is embodied in a safety claw clutch which comprises coaxial disk- or ring-shaped driving and driven clutch elements at least one of which is movable axially toward and away from the other clutch element, means (e.g., a helical spring) for yieldably biasing the one clutch element toward the other clutch element, and means (e.g., an electric motor) for rotating the driving clutch element in a predetermined direction. The clutch elements have adjacent end faces provided with annuli of alternating claws and recesses, and the claws of the driving clutch element normally extend into the recesses of the driven clutch element and vice versa so that the driving clutch element normally rotates the driven clutch element in the predetermined direction when the driving clutch element receives torque from the rotating means. The end faces of the clutch elements have first surfaces which constitute the bottom surfaces of the respective recesses and make a first acute angle with a plane which is normal to the common axis of the clutch elements. The claws of the driving and driven clutch elements respectively have front and rear surfaces of which makes with the aforementioned plane a second acute angle (which is preferably larger and most preferably a multiple of the first acute angle). Each of the front and rear surfaces is adjacent to a first surface of the respective end face and each front surface abuts against one of the rear surfaces when the driving clutch element rotates the driven clutch element.

The claws further comprise top surfaces or lands which are parallel to the first surfaces of the respective end faces. Furthermore, the claws of the driving clutch element and the claws of the driven clutch element respectively have rear and front surfaces the height of each of which exceeds the height of the front surfaces of claws of the driving clutch element and the height of the rear surfaces of claws of the driven clutch element, as considered in the direction of the common axis of driving and driven clutch elements. One end of the front surface of each claw of the driven clutch element and one end of the rear surface of each claw of the driving clutch element is preferably located in the aforementioned plane when the driving clutch element rotates the driven clutch element. The front surfaces of claws on the driven clutch element and the rear surfaces of claws on the driving clutch element are preferably parallel to the common axis of the clutch elements. The first surfaces of the end face of the driving clutch element and the front surfaces of claws of the driving clutch element slope upwardly as considered counter to the direction of rotation of the driving clutch element. For example, each clutch element may comprise two claws and two recesses.

The novel features which are considered as characteristic of the invention are set forth in particular in the appended claims. The improved safety clutch itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
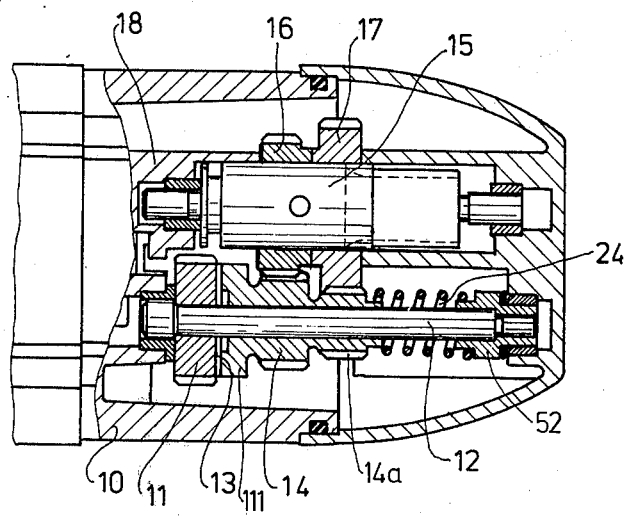
FIG. 1 is a fragmentary axial sectional view of a machine which embodies the improved safety clutch.

FIG. 1 shows a portable power tool or the like which embodies the improved safety clutch. The power tool comprises a housing 10 the left-hand portion (not shown) of which contains a prime mover (e.g., an electric motor) having an output shaft 211 (FIG. 7) with an integral or rigidly affixed pinion 311 in mesh with a gear 11. The gear 11 constitutes the driving element of the improved safety claw clutch 13 and normally drives a second clutch element 111 forming part of a second gear 14. The gears 11 and 14 are rotatably mounted on a shaft 12 which is journalled in the housing 10 in parallelism with the output shaft 211 of the prime mover.

The gear 14 forms part of a compound gear including a smaller second gear 14a. The gears 14, 14a respectively mesh with the gears 16, 17 on a shaft 15 which drives a spindle 18. The latter can rotate the holder for a drilling or boring tool, not shown. The gears 14, 14a (and clutch element 111) are movable axially of the shaft 12 and are biased toward the clutch element or gear 11 by a helical clutch spring 24. The bias of the spring 24 must be overcome by the resistance which the spindle 18 offers to rotation before the gear 11 can rotate relative to the gears 14, 14a and clutch element 111. The power tool of FIG. 1 is but one example of machines wherein the improved safety claw clutch can be put to use as a substitute for presently known safety clutches.

Figure 2:
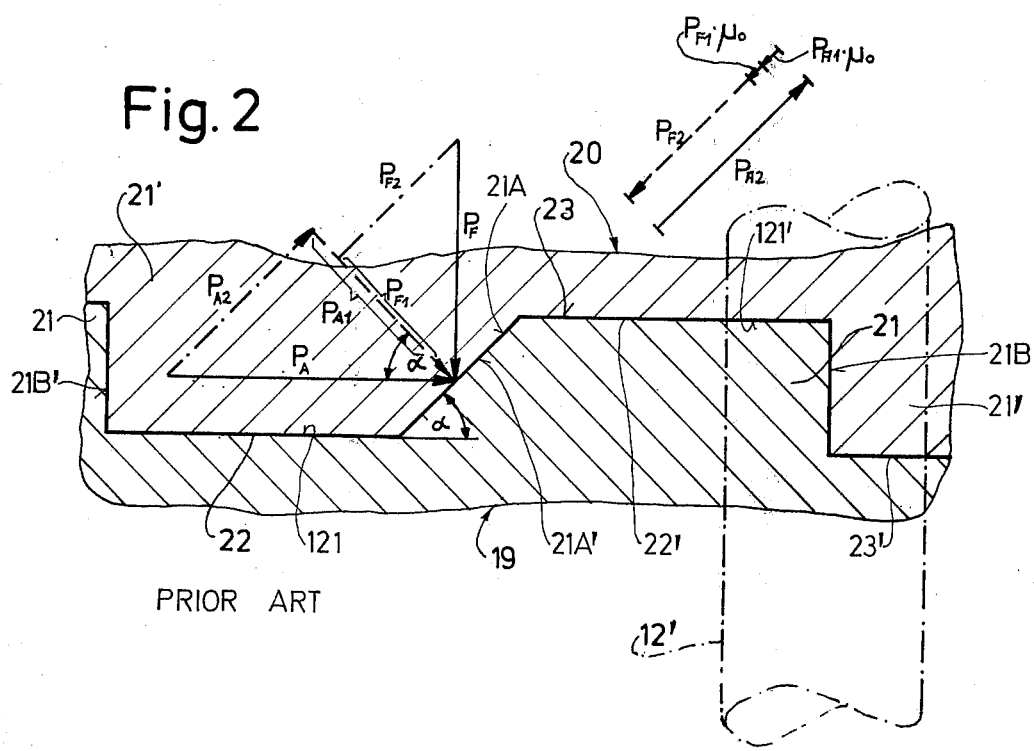
FIG. 2 is an enlarged fragmentary developed sectional view of a conventional safety clutch in engaged condition.

FIG. 2 shows a portion of a conventional safety clutch having cooperating clutch elements 19, 20 mounted on a shaft 12'. In the clutch of the present invention, the elements 19, 20 of FIG. 2 are respectively replaced by the clutch elements 11 and 111. That end face of the driving clutch element 19 of FIG. 2 which faces the driven clutch element 20 is formed with at least two claws or jaws 21 normally cooperating with complementary claws 21' on the adjacent end face of the clutch element 20. The clutch element 19 is assumed to be driven clockwise, as viewed from the top of FIG. 2, so that the fully shown claw 21 moves in a direction to the left. This claw extends axially from the bottom surface 22 of a space or recess 121 which is a mirror image of the claw 21 and normally receivers a claw 21' of the clutch element 20. For example, each of the clutch elements 19, 20 may be formed with two claws 21, 21' and two spaces or recesses 121, 121'. The front surface 21A of the claw 21 makes with the surface 22 an acute angle alpha of for example 45 degrees. The surface 22 is normal to the axis of the shaft 12'. The top surface or land 23 of the claw 21 is parallel to the surface 22 and the rear surface 21B of the claw 21 extends radially of the shaft 12', i.e., it is normal to the surface 22. The bottom surface in a space or recess 121' of the clutch element 20 is shown at 22', the rear surface of a claw 21' at 21A', the top surface of a claw 21' at 23', and the front surface of a claw 21' at 21B'.

The disengaging moment of the clutch of FIG. 2 is determined by a spring (not shown) which performs the function of the spring 24 of FIG. 1. For example, and assuming that the conventional clutch of FIG. 2 is used as a substitute for the improved safety claw clutch 13 of FIG. 1, and further assuming that the tool which is driven by the spindle 18 of FIG. 1 happens to jam so that the clutch element 20 ceases to rotate with the clutch element 19, the front surface 21A of each claw 21 slides along the rear surface 21A' of the adjacent claw 21' whereby the clutch element 19 or 20 is moved axially of the shaft 12' against the opposition of the clutch spring so that the claws 21 ride over the claws 21' and thereupon descend into successive spaces 121'.

The forces which develop during operation of the conventional clutch of FIG. 2 include a force $P_F$ which is the force of the clutch spring serving to bias the clutch element 19 against the clutch element 20 or vice versa, and a force $P_A$ which is the disengaging force tending to move the claws 21 out of the spaces 121' and the claws 21' out of the spaces 121. The factor $\mu_0$ is indicative of the tendency of lubricated metallic material (preferably steel) of the clutch element 19 to adhere to the preferably identical material of the clutch element 20. For example, the value of the factor $\mu_0$ may be 0.1. The forces $P_{A1}$, $P_{A2}$ and $P_{F1}$, $P_{F2}$ are components of the forces $P_A$ and $P_F$. The forces $P_{A1}$ and $P_{F1}$ are normal and the forces $P_{A2}$ and $P_{F2}$ are parallel to the surface 21A. The conditions for disengagement of the conventional safety clutch of FIG. 2 can be defined as follows:

$$P_A > \frac{P_{F2} + P_{F1} \cdot \mu_0 + P_{A1} \cdot \mu_0}{\sin \alpha}.$$

Figure 3:
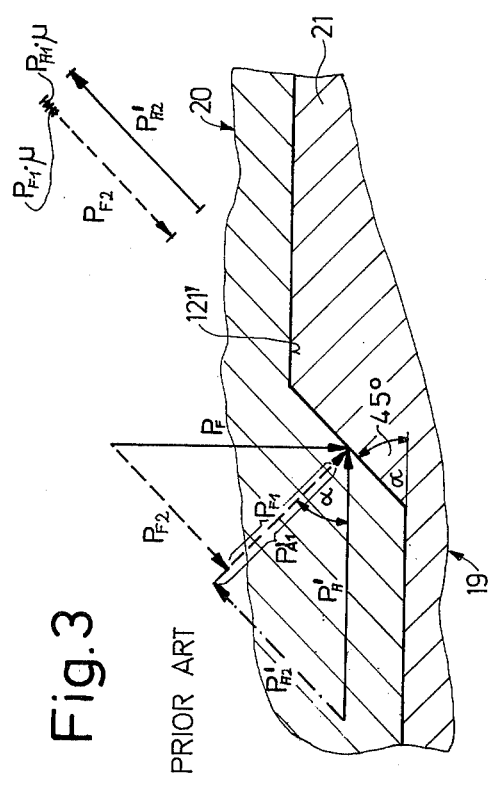
FIG. 3 illustrates a portion of the conventional clutch of FIG. 2 and the diagram of forces which develop when the driving clutch element rotates relative to the normally driven clutch element.

FIG. 3 shows the conventional clutch of FIG. 2 subsequent to angular displacement of the clutch element 19 relative to the clutch element 20, i.e., subsequent to penetration of the fully shown claw 21 of FIG. 2 into the next-following space 121' of the clutch element 20. The clutch element 19 is assumed to continue to rotate relative to the clutch element 20. The difference between the conditions prevailing in FIG. 2 (when the clutch element 20 is assumed to rotate with the clutch element 19) and the conditions prevailing in FIG. 3 (wherein the clutch element 19 is assumed to rotate relative to the clutch element 20) is that the value of the factor $\mu_0$ is reduced to $\mu = 0.04$. Thus, the remaining or reengaging force $P'_A$ which tends to maintain the clutch element 19 in engagement with the clutch element 20 can be defined as follows:

$$P'_A = \frac{P_{F2} + P_{F1} \cdot \mu + P'_{A1} \cdot \mu}{\sin \alpha}.$$

The just defined force $P'_A$ causes considerable wear and must be taken up by the person holding the housing of the power tool which embodies the conventional clutch of FIGS. 2 and 3.

Figure 4:
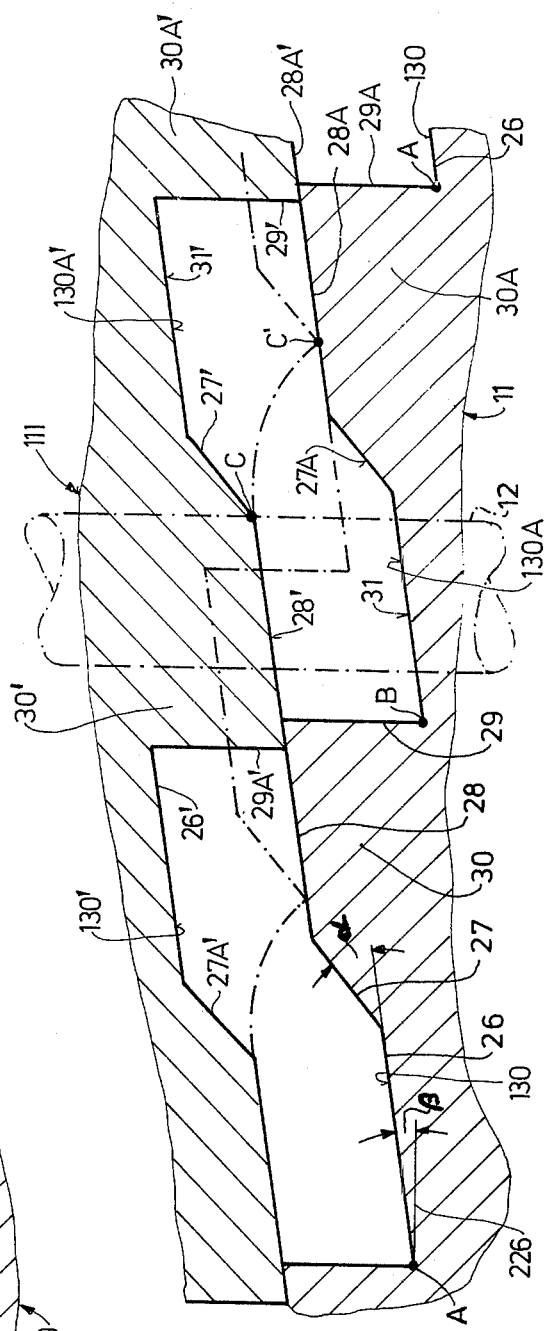
FIG. 4 is an enlarged fragmentary developed sectional view of the improved safety clutch of FIG. 1, with the clutch elements in positions they assume when the clutch is disengaged.

FIG. 4 shows the construction of the improved safety clutch 13 of FIG. 1. That side of the driving clutch element 11 which faces the clutch element 111 has alternating claws 30, 30A and recesses or spaces 130, 130A. The adjacent side of the driven clutch element 111 has alternating claws 30', 30A' and recesses or spaces 130', 130A'. The bottom surface 26 of the recesss 130 makes a small acute angle beta with a plane 226 which is normal to the axis of the shaft 12. The front surface 27 of the claw 30 makes with the adjacent bottom surface 26 and acute angle alpha which is greater than beta. The top surface 28 of the claw 30 is parallel to the adjacent bottom surface 26. The rear surface 29 of the claw 30 extends radially and is parallel to the axis of the shaft 12, i.e., normal to the plane 226. The length of the rear surface 29, as considered in the axial direction of the shaft 12, is such that its deepmost point B is located in a plane (226) which further includes the deepmost or innermost point A of the preceding recess 130 and is normal to the axis of the shaft 12. The surface 31 of FIG. 4 is the bottom surface of the recess 130A behind the left-hand claw 30 of FIG. 4. The front, top and rear surfaces of the right-hand claw 30A are respectively shown at 27A, 28A and 29A. The innermost point of the rear surface 29A coincides with the point A because the clutch element 11 is assumed to have two claws 30, 30A and two recesses 130, 130A.

The configuration of claws 30', 30A' on the clutch element 111 is complementary to that of the recesses 130, 130A, and the configuration of recesses 130', 130A' is complementary to that of claws 30, 30A. The length of a top surface 28, 28A, 28' or 28A' equals the length of a bottom surface 26, 31, 26' or 31'. The rear surfaces of claws 30', 30A' are shown at 27', 27A', and the front surfaces of the claws 30', 30A' are shown at 29', 29A'.

Figure 5:
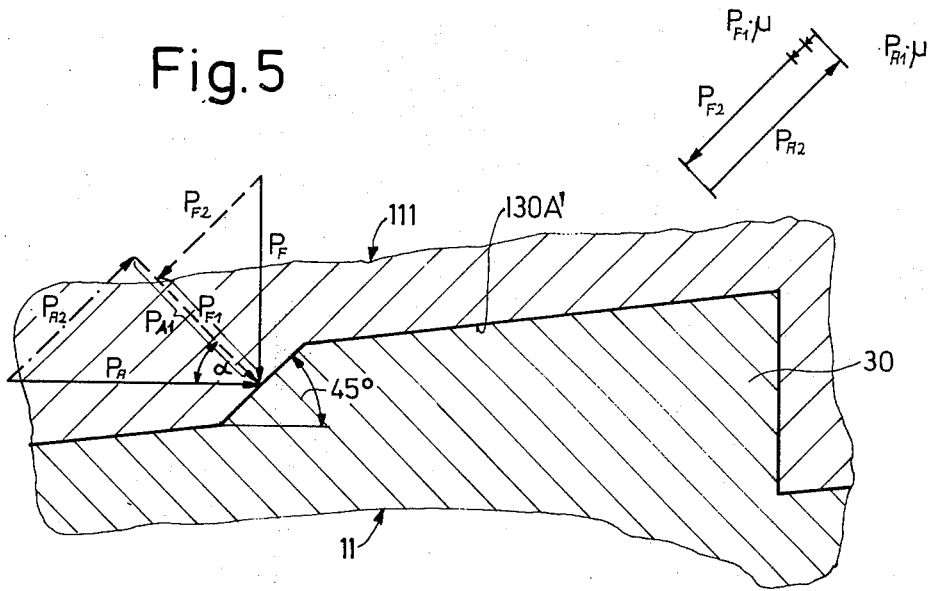
FIG. 5 shows a portion of the structure of FIG. 4, but with the clutch in engaged condition.
Figure 6:
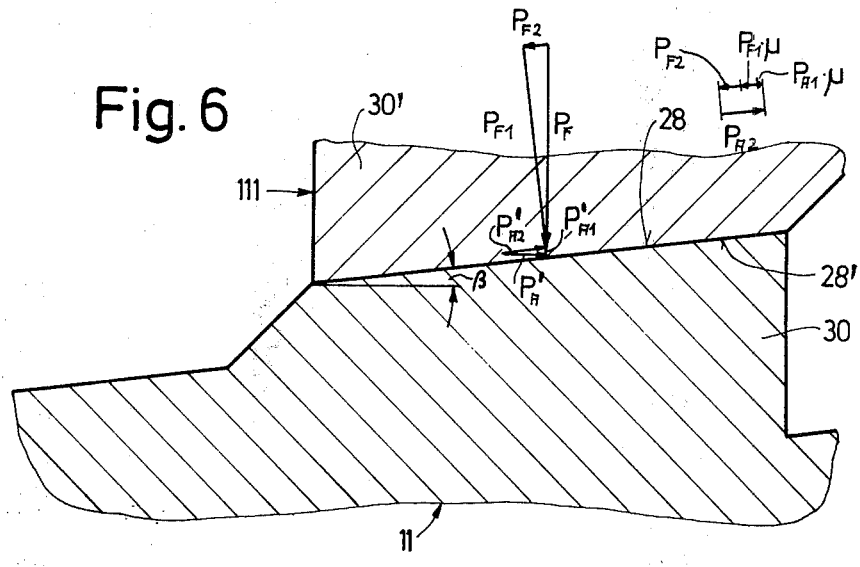
FIG. 6 illustrates the structure of FIG. 5 and the forces which develop while the driving clutch element rotates relative to the normally driven clutch element.

FIG. 5 illustrates the distribution of forces in the improved clutch 13 when the claws 30, 30A still extend into the adjacent recesses 130A', 130' and the clutch element 11 drives the clutch element 111 without any slippage. FIG. 6 shows the clutch 13 while the driving clutch element 11 rotates relative to the normally driven clutch element 111 and the top surface 28 of the claw 30 rides along the top surface 28' of the claw 30'. It is assumed that the factor $\mu_0$ is again 0.01 when the improved clutch is properly engaged. The disengaging force $P_A$ at which the clutch element 11 begins to turn and slip relative to the clutch element 111 is defined as follows:

$$P_A > \frac{P_{F2} + P_{F1} \cdot \mu_0 + P_{A1} \cdot \mu_0}{\sin \alpha}.$$

When the clutch element 11 moves relative to the clutch element 111 and the value of the factor $\mu$ is reduced to 0.04, the reengaging or remaining force which tends to maintain the clutch 13 in engagement is $$P'_A = \frac{P_{F2} + P_{F1} \cdot \mu + P_{A1} \cdot \mu}{\cos \beta}.$$

It will be seen that the force $P'_A$ is much smaller than the disengaging force $P_A$ because the angle beta is much smaller than the angle alpha (it is assumed that the angle alpha is 45°, the same as in the conventional safety clutch of FIGS. 2 and 3). For example, the force $P'_A$ may be in the range of 20 – 25% of the force $P_A$. The angle beta need not appreciably exceed 5° and can be substantially less than 5°, for example, 2° – 4°. Thus, the angle alpha may be a whole multiple of the angle beta.

An important advantage of the improved safety clutch 13 is that, once the claws 30, 30A are expelled from the respective recesses 130A', 130', i.e., once the clutch element 11 begins to turn relative to the clutch element 111, the clutch does not become reengaged. This will be understood by referring to FIG. 4 and by considering the path of the point C at the rear end of the top surface 28' of the claw 30'. When the claw 30 is caused to leave the recess 130A' and its top surface 28 slides along the top surface 28', the point C moves to the position C' when the surface 28 moves beyond the surface 28', i.e., the point C abuts against the top surface 28A of the next-following claw 30A on the driving clutch element 11. This is due to the fact that the clutch element 11 rotates rapidly enough to move its surface 28A into the path of the point C before the claw 30' can penetrate into the recess 130A. The clutch elements 11, 111 return into full engagement with each other only during starting or during running out of the prime mover which drives the clutch element 11. This absence of renewed penetration of claws on the clutch element 11 into the recesses of the clutch element 111 explains the relatively low value of the force $P'_A$. Since the force $P'_A$ is small, the operator of the power tool must overcome only such small force $P'_A$ when the improved clutch is disengaged but the motor continues to rotate the clutch element 11. Also, this reduces the wear on the motor, on the parts of the clutch and on other moving parts of the power tool.

Referring again to FIG. 1, when the clutch 13 is disengaged, the clutch element 11 continues to rotate whereby its claws slide along the claws of the clutch element 111 and the force which tends to rotate the gears 14, 14a and shaft 15 equals only $P'_A$. Thus, the torque which the gears 14, 14a tend to transmit to the spindle 18 and which must be taken up by the operator's hands (the hands hold the housing 10) equals only the moment of friction between the rotating clutch element 11 and the axially shifted clutch element 111. The bias of the spring 24 need not be appreciably increased in response to disengagement of the clutch 13.

The clutch 13 also becomes disengaged if the motor which drives the pinion 311 is arrested while the parts 14, 14a, 15, 16, 17 and 18 continue to rotate due to inertia. The clutch element 11 is then held against rotation by the pinion 311 and the claws 30'. 30A' of the clutch element 111 ride over the claws 30, 30A of the clutch element 11 as long as the clutch 111 remains in rotary motion.

Figure 7:
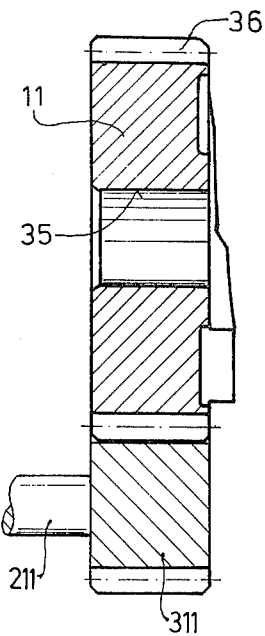
FIG. 7 is an axial sectional view of the driving element of the improved clutch.
Figure 7A:
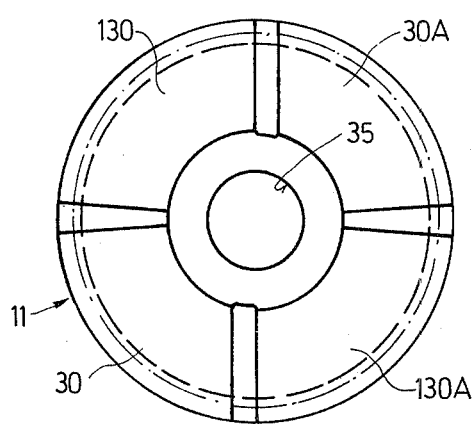
FIG. 7a is an end elevational view as seen from the right-hand side of FIG. 7.

FIGS. 7 and 7a show the driving clutch element 11. The bore 35 receives the shaft 12 and the teeth 36 mesh with the teeth of the pinion 311 on the output shaft 211 of the prime mover. FIG. 7a shows the two claws 30, 30A and the two recesses 130, 130A.

Figure 8:
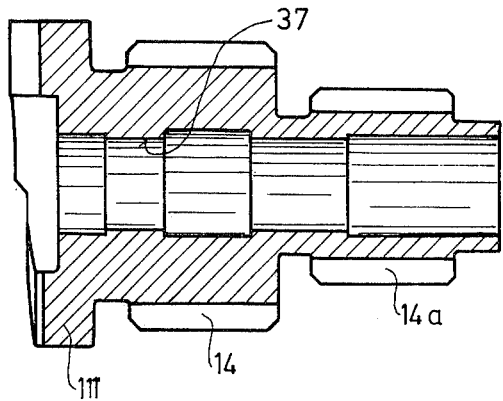
FIG. 8 is an axial sectional view of the driven element of the improved clutch.
Figure 8A:
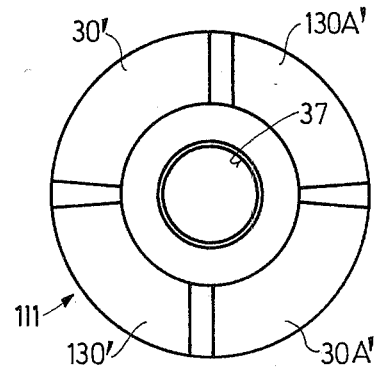
FIG. 8a is an end elevational view as seen from the left-hand side of FIG. 8.

The gear cluster 14, 14a and the clutch element 111 may form a one-piece unit (see FIG. 8) having a bore 37 which receives the shaft 12 in such a way that the parts 14, 14a, 111 are movable axially under the bias and against the opposition of the spring 24. The latter reacts against a retainer 52 in the housing 10 and bears against a shoulder of the gear 14a. The claws 30', 30A' and recesses 130', 130A' of the driven clutch element 111 are shown in FIG. 8a.

Without further analysis, the foregoing will so fully reveal the gist of the present invention that others can by applying current knowledge, readily adapt it for various applications without omitting features which fairly constitute essential characteristics of the generic and specific aspects of our contribution to the art and, therefore such adaptations should and are intended to be comprehended within the meaning and range of equivalence of the following claims.

What is claimed as new and desired to be protected by Letters Patent is set forth in the appended claims:

1. A safety claw clutch, comprising coaxial driving and driven clutch elements at least one of which is movable axially toward and away from the other of said clutch elements; means for yieldably biasing said one clutch element toward said other clutch element; and means for rotating said driving clutch element in a predetermined direction, said clutch elements having adjacent end faces provided with annuli of alternating claws and recesses and the claws of said driving clutch element normally extending into the recesses of said driven clutch element and vice versa so that said driving clutch element normally rotates said driven clutch element in said direction, said end faces of said clutch elements having first surfaces constituting the bottom surfaces of the respective recesses and making a first acute angle with a plane which is normal to the common axis of said clutch elements and the claws of said driving and driven clutch elements respectively having front and rear surfaces each making with said plane a second acute angle, each of said front and rear surfaces being adjacent to a first surface of the respective end face and each of said front surfaces abutting against one of said rear surfaces when said driving clutch element rotates said driven clutch element.

2. A clutch as defined in claim 1, wherein said claws have top surfaces which are parallel to the first surfaces of the respective end faces, the claws of said driving clutch element and the claws of said driven clutch element respectively having rear and front surfaces the height of which exceeds the height of the front surfaces of claws of said driving clutch element and the height of the rear surfaces of claws of said driven clutch element, as considered in the direction of said axis.

3. A clutch as defined in claim 2, wherein said first surfaces of the end face of said driving clutch element and the front surfaces of claws of said driving clutch element slope upwardly counter to said direction.

4. A clutch as defined in claim 2, wherein one end of the rear surface of each claw of said driving clutch element and one end of the front surface of each claw of said driven clutch element is located in said plane when said driving clutch element rotates said driven clutch element.

5. A clutch as defined in claim 2, wherein each of said clutch elements comprises two claws.

6. A clutch as defined in claim 2, wherein the rear surfaces of claws of said driving clutch element and the front surfaces of claws of said driven clutch element are substantially parallel to said axis.

7. A clutch as defined in claim 1, wherein said first acute angle is smaller than said second acute angle.

8. A clutch as defined in claim 7, wherein said second acute angle is a multiple of said first acute angle.

9. A clutch as defined in claim 1, wherein at least one of said clutch elements forms part of a gear.

10. A clutch as defined in claim 1, wherein said one clutch element is said driven clutch element and further comprising a common shaft for said clutch elements, said clutch elements being rotatable on said shaft.

* * * * *